Patented Nov. 17, 1953

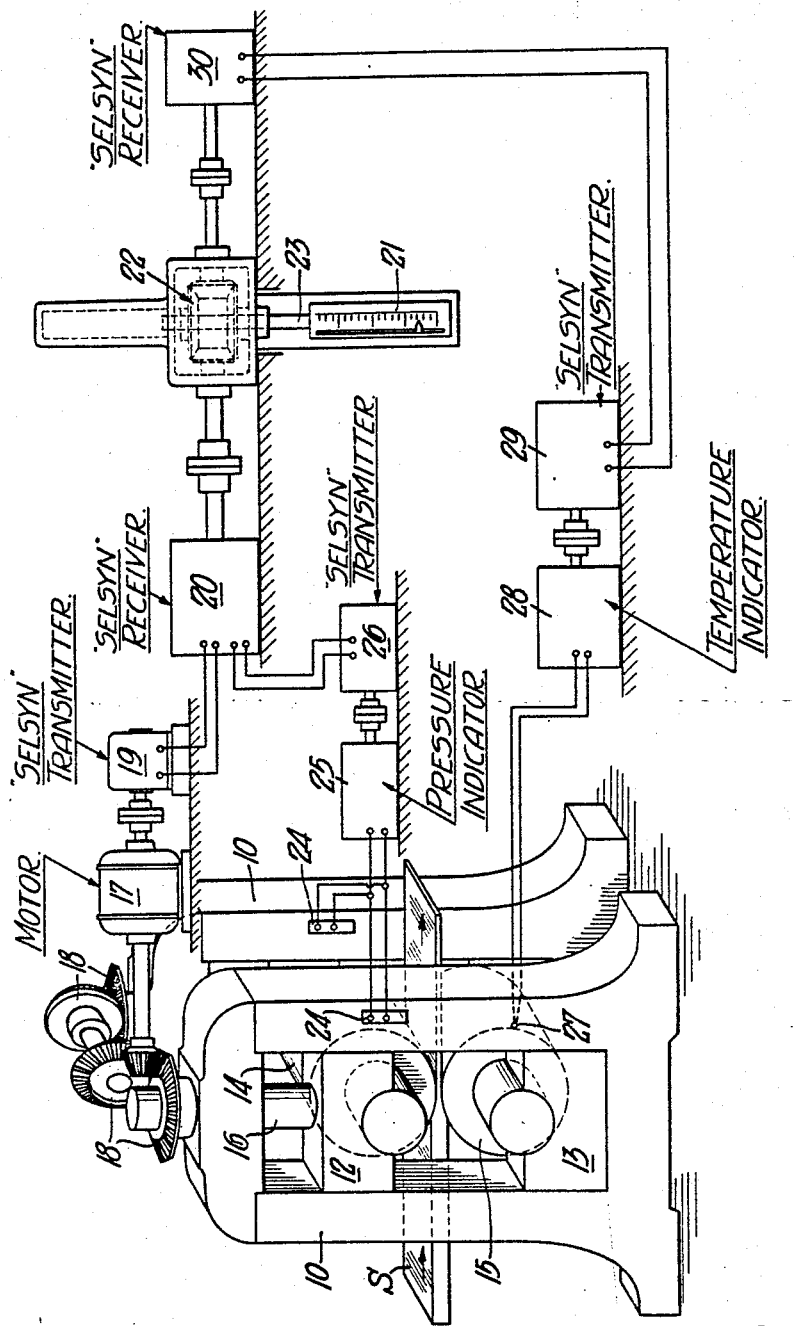

2,659,154

UNITED STATES PATENT OFFICE 2,659,154

APPARATUS FOR MEASURING STRIP THICKNESS

George H. Rendel, Pittsburgh, Pa., assignor to United States Steel Corporation, a corporation of New Jersey Application February 15, 1952, Serial No. 271,687

5 Claims. (Cl. 33—147)

This invention relates to an apparatus for measuring the thickness of metal strip as it passes through a rolling mill.

Before strip is introduced to a roll stand, the spacing between the rolls is adjusted to a predetermined distance to furnish a rolled product of the desired thickness. However, the thickness of the rolled product is not the same as the initial roll spacing, but varies principally because of two other major factors, namely the pressure of the strip against the rolls and the temperature increase that takes place in roll bodies during a rolling operation. The pressure stretches the mill housings, compresses the roll bearings, and also deflects or bends the rolls, and consequently increases the roll spacing and the strip thickness. The increase in temperature expands the roll bodies and consequently diminishes the roll spacing and the strip thickness. To maintain the desired strip thickness it is necessary to adjust the roll spacing to compensate for both the pressure and temperature factors.

An object of the present invention is to provide a unitary apparatus which continuously measures the actual spacing between rolls by taking into account the pressure and temperature factors, and thus furnishes a continuous indication of the true strip thickness.

A further object is to provide such an apparatus which is composed of known types of measuring, transmitting, receiving and indicating devices in a novel combination that furnishes the desired indication accurately and practically instantaneously.

The single figure of the drawing shows schematically a roll stand which is equipped with an apparatus embodying principles of the present invention. The roll stand includes a pair of housings 10, upper and lower roll bearings 12 and 13 supported in each of said housings, and upper and lower work rolls 14 and 15 rotatably mounted in said bearings. The housings carry positioning screws 16 which are connected with the upper roll bearings 12 for adjusting the spacing between the rolls in the usual way. The screws are operated by a motor 17 through the usual shafts and bevel gears 18. The figure also shows a section of metal strip S which passes between the rolls 14 and 15 and is reduced in thickness as indicated in somewhat exaggerated fashion.

For measuring the initial roll spacing, the apparatus of the present invention includes a motion transmitter 19 which is connected to motor 17 and driven thereby. Preferably the transmitter 19 is electrical and is of the "Selsyn" type. It is electrically connected to a differential "Selsyn" receiver 20, which in turn is connected to a decimal thickness indicator 21 through differential gearing 22 and an output shaft 23. When motor 17 is operated to adjust the positioning screws 16 and change the spacing between the rolls, the transmitter 19, receiver 20 and differential gearing 22 also operate to change the reading on the indicator 21. This indicator is calibrated to show the exact roll spacing.

The mill carries devices 24 for measuring the factor of roll pressure. Convenient devices for this purpose are strain gauges which can be mounted on the roll housings for measuring the elongation or stretch, or else on the roll bearings for measuring the compression. The roll pressure also deflects or bends the rolls, but these three main effects of pressure remain in proportion. Consequently, with proper calibration of the indicator, measurement of only one effect furnishes a measurement of the entire separation of the rolls caused by roll pressure. The strain gauges are connected to a pressure indicator 25, which preferably is of the recording-controller type, such as a Leeds and Northrup "Speedomax" potentiometer, and can be calibrated to indicate pounds of pressure and the additional roll separation in inches caused thereby. Pressure indicator 25 is mechanically connected to an electrical motion transmitter 26, preferably of the "Selsyn" type similar to transmitter 19. Transmitter 26 is electrically connected to the receiver 20, which automatically adds the increase in roll spacing caused by the pressure to the reading transmitted to the decimal thickness indicator 21.

For measuring the factor of temperature increase, a temperature measuring device 27, such as a thermocouple, is mounted in contact with one of the rolls 14 or 15 and is electrically connected with a temperature indicator 28. The latter indicator preferably is similar to the indicator 25, except that it is calibrated to show the roll temperature and in decimal parts of an inch the roll expansion caused by temperature increase over the initial temperature. The indicator 28 is mechanically connected to a motion transmitter 29, preferably also of the "Selsyn" type similar to transmitters 19 and 26. The transmitter 29 is electrically connected to a receiver 30, which in turn is connected to the differential gearing 22 on the opposite side from the receiver 20. The differential thus automatically subtracts the diminishment in roll spacing caused by the factor of temperature increase from the reading transmitted to the decimal thickness indicator.

To explain the operation of the apparatus more carefully, I shall follow through a hypothetical example. First motor 17 is operated to move the positioning screws 16 to the adjustment where rolls 14 and 15 just touch and the spacing is nil. Assume the roll temperature as indicated by the thermocouple 27 and temperature indicator 28 is 100° F. The decimal thickness indicator 21 now is set to read zero under these conditions. Assume further that the desired thickness of rolled product is 0.150 inch and that a roll pressure of approximately 1,000,000 pounds is expected during the rolling operation. The approximate increase in roll spacing for any given pressure is known; assume that 1,000,000 pounds pressure produces an increase of 0.070 inch, which is distributed among 0.010 inch stretch in the housings, 0.040 inch compression in the bearings, and 0.020 deflection in the rolls. The motor 17 next is operated to move the positioning screws to the adjustment where the initial spacing between the rolls is 0.080 inch, which is the difference between the desired strip thickness and the expected increase in roll spacing from pressure. The transmitter 19, receiver 20, and differential gearing 22 transmit this reading to the decimal thickness indicator 21, which now shows a spacing of 0.080 inch.

Next the strip S is introduced to the rolls. A pressure of 1,000,000 pounds would indicate 0.070 inch on recorder 25. The transmitter 26, receiver 20, and differential gearing 22 transmit this reading to the thickness indicator 21, which now shows 0.150 inch. If the pressure is somewhat greater or less than 1,000,000 pounds, the reading varies accordingly and the motor 17 can be operated to make the necessary correction in the roll spacing.

As rolling proceeds, the roll temperature gradually increases. Assume that it reaches 350° F. and expands each roll 0.020 inch in diameter. The actual roll spacing diminishes by this same amount. The temperature increase and the diminishment in the roll spacing are indicated on the indicator 28. Transmitter 29 and receiver 30 transmit this change to the differential gearing 22, which automatically subtracts it from the reading on the thickness indicator 21. The motor 17 again can be operated to make the necessary correction in the spacing of the rolls.

From the foregoing description it is seen that the present invention affords an apparatus which accurately and continuously measures strip thickness and thus enables the roll spacing to be corrected quickly to compensate for pressure and temperature factors. The various components of the apparatus, such as the strain gauges, the thermocouple, the indicators, the transmitters, the receivers, and the differential gearing, are parts of standard manufacture and therefore are not shown in detail.

While I have shown and described only a single embodiment of the invention, it is apparent that modifications may arise. Therefore, I do not wish to be limited to the disclosure set forth but only by the scope of the appended claims.

I claim:

1. The combination, with a roll stand which includes roll housings, work rolls rotatably supported in said housings, and positioning means for adjusting the spacing between said rolls, of an apparatus for measuring the actual spacing between said rolls during a rolling operation and thus measuring the thickness of the rolled product comprising indicator means connected with said positioning means for measuring the initial spacing between said rolls before a rolling operation begins, indicator means connected with said roll stand for measuring the increase in spacing between said rolls caused by pressure during rolling, indicator means connected with said rolls for measuring the diminishment in roll spacing caused by the increase in roll temperature during rolling, and means interconnecting the three said indicator means to correct continuously during a rolling operation the measurement indicated on the first such means for changes caused by pressure and temperature.

2. The combination, with a roll stand which includes roll housings, work rolls rotatably supported in said housings, and positioning means for adjusting the spacing between said rolls, of an apparatus for measuring the actual spacing between said rolls during a rolling operation and thus measuring the thickness of the rolled product comprising indicator means connected with said positioning means for measuring the initial spacing between said rolls before a rolling operation begins, indicator means connected with said housings for measuring the increase in spacing between said rolls caused by pressure during rolling, means connecting said second indicator means with said first indicator means for adding their measurements, indicator means connected with said rolls for measuring the diminishment in roll spacing caused by the increase in roll temperature during rolling, and means connecting said third indicator means with the first two for subtracting continuously during a rolling operation its measurement from the combined measurement of the first two.

3. The combination with a roll stand which includes roll housings, work rolls rotatably supported in said housings, and positioning means for adjusting the spacing between said rolls, of an apparatus for measuring the actual spacing between said rolls during a rolling operation and thus measuring the thickness of the rolled product comprising a first transmitter connected with said positioning means for transmitting a measurement of the initial spacing between said rolls before a rolling operation begins, means connected with said housings for measuring the increase in spacing between said rolls caused by pressure during rolling, a second transmitter connected with said last named measuring means, a first receiver connected to both said transmitters for adding the measurements transmitted thereby, means connected with said rolls for measuring the diminishment in roll spacing caused by the increase in roll temperature during rolling, a third transmitter connected with said last named measuring means, a second receiver connected with said third transmitter, a differential connected at opposite sides to said receivers, and an indicator connected to said differential.

4. The combination with a roll stand which includes roll housings, work rolls rotatably supported in said housings, positioning screws for adjusting the spacing between said rolls, and drive mechanism for said positioning screws, of an apparatus for measuring the actual spacing between said rolls during a rolling operation and thus measuring the thickness of the rolled product comprising a first transmitter connected with said drive mechanism for transmitting a measurement of the initial spacing between said rolls before a rolling operation begins, a strain gauge connected with said housings for measuring the increase in spacing between said rolls caused by pressure during rolling, an indicator and a second transmitter connected with said strain gauge, a first receiver connected to both said transmitters for adding the measurements transmitted thereby, a thermocouple connected with said rolls for measuring the diminishment in roll spacing caused by the increase in roll temperature during rolling, an indicator and a third transmitter connected with said thermocouple, a second receiver connected with said third transmitter, a differential connected at opposite sides to said receivers and having an output shaft, and an indicator connected to said output shaft.

5. The combination with a roll stand which includes roll housings, work rolls rotatably supported in said housings, positioning screws for adjusting the spacing between said rolls, and drive mechanism for said positioning screws, of an apparatus for measuring the actual spacing between said rolls during a rolling operation and thus measuring the thickness of the rolled product comprising a first "Selsyn" transmitter connected with said drive mechanism for transmitting a measurement of the initial spacing between said rolls before a rolling operation begins, a strain gauge connected with said housings for measuring the increase in spacing between said rolls caused by pressure during rolling, an indicator and a second "Selsyn" transmitter connected with said strain gauge, a first "Selsyn" receiver electrically connected to both said transmitters for adding the measurements transmitted thereby, a thermocouple connected with said rolls for measuring the diminishment in roll spacing caused by the increase in roll temperature during rolling, an indicator and a third "Selsyn" transmitter connected with said thermocouple; a second "Selsyn" receiver electrically connected with said third transmitter, a differential gearing connected at opposite sides to said receivers and having an output shaft, and a decimal thickness indicator connected to said output shaft.

GEORGE H. RENDEL.

References Cited in the file of this patent

UNITED STATES PATENTS

| Number | Name | Date |
|---|---|---|
| 2,332,288 | Zeitlin | Oct. 19, 1943 |
| 2,345,931 | Gates | Apr. 4, 1944 |
| 2,603,001 | Fox et al. | July 15, 1952 |

OTHER REFERENCES

Publication: "Selsyns," General Electric Co., Schenectady, N. Y., pamphlet GEA-21176. (Rec'd. Feb. 16, 1939, copy in 33-204.66.)